United States Patent
Seok et al.

(10) Patent No.: US 12,545,071 B1
(45) Date of Patent: Feb. 10, 2026

(54) BEARING TYPE BUSH FOR MOUNTING AN ANTI-ROLL BAR FOR VEHICLE OR MECHANICAL DEVICE

(71) Applicant: AIA CO., LTD., Gyeonggi-do (KR)

(72) Inventors: Sang Ho Seok, Gyeonggi-do (KR); Sung Soo Jin, Incheon (KR); Jun Young Jo, Gyeonggi-do (KR); Se Heum Han, Gyeonggi-do (KR)

(73) Assignee: AIA CO., LTD., Gyeonggi-do (KR)

( * ) Notice: Subject to any disclaimer, the term of this patent is extended or adjusted under 35 U.S.C. 154(b) by 0 days.

(21) Appl. No.: 18/924,315

(22) Filed: Oct. 23, 2024

(51) Int. Cl.
*B60G 21/055* (2006.01)

(52) U.S. Cl.
CPC .. *B60G 21/0551* (2013.01); *B60G 2204/1222* (2013.01); *B60G 2204/41* (2013.01); *B60G 2204/418* (2013.01)

(58) Field of Classification Search
CPC ........ B60G 21/0551; B60G 2204/1222; B60G 2204/42; B60G 2204/418
See application file for complete search history.

(56) References Cited

U.S. PATENT DOCUMENTS

| 5,352,044 A | * | 10/1994 | Jordens | F16C 11/04 384/295 |
| 2018/0141402 A1 | * | 5/2018 | Oh | F16F 1/38 |
| 2025/0058599 A1 | * | 2/2025 | Kim | B60G 21/0551 |

FOREIGN PATENT DOCUMENTS

| KR | 20140013573 A | * | 2/2014 | ........... B60G 21/055 |
| KR | 2021062133 A | * | 5/2021 | ......... B60G 21/0551 |
| KR | 20210062133 A | * | 5/2021 | ............ F16C 33/106 |

OTHER PUBLICATIONS

Espace translation of KR 2021 0062133 A (Year: 2021).*
Patent application translation for KR 2014/0013573 A (Year: 2014).*

* cited by examiner

*Primary Examiner* — Jason D Shanske
*Assistant Examiner* — Scott Lawrence Strickler
(74) *Attorney, Agent, or Firm* — IPLA P.A.

(57) ABSTRACT

Provided is a bush for supporting an anti-roll bar installed in a vehicle or one of various mechanical devices to maintain the lateral balance and handle torsional loads to prevent rolling, and more specifically, to a bush, which can minimize rubber molding, achieve lightweight by substituting with plastic components as much as possible, obtaining robust support, minimizing the load in an R-direction, and enhancing resistance in a Q-direction.

3 Claims, 6 Drawing Sheets

BEARING TYPE BUSH FOR MOUNTING AN ANTI-ROLL BAR FOR VEHICLE OR MECHANICAL DEVICE

BACKGROUND

The present invention relates to a bush for supporting an anti-roll bar installed in a vehicle or one of various mechanical devices that experience movement and vibration, and more specifically, to a bearing type bush for mounting an anti-roll bar of a vehicle or a mechanical device, which is improved to achieve lightweight, enhance longitudinal resistance of an anti-roll bar, and minimize a rotational load thereof.

As is well-known, vehicles and various mechanical devices often use anti-roll bars to maintain lateral balance, prevent rolling, and handle torsional loads. Such an anti-roll bar is installed using a mounting bush made of rubber material to provide insulation and absorb vibrations and impacts.

An example of such an anti-roll bar is a stabilizer bar installed in a vehicle, which is installed to suppress and control vibrations and noise generated from tires during vehicle operation, thereby enhancing driving stability. The mounting bush is used to fix the stabilizer bar to a vehicle body and suppress and control vibrations and noise.

Now, a conventional art related to the mounting bush will be described. A bush made of rubber material is molded, a metal plate is insert-molded inside the bush, and then, a metal bracket is pressed and coupled to fix the mounting bush to the vehicle body.

Such a conventional mounting bush is heavy since including the inner metal plate and the outer metal bracket, which is contrary to the trend towards lighter weight in the automotive industry. Moreover, the conventional mounting bush involves lots of processes, such as the curing process of performing the insert injection molding with different materials and performing the rubber molding, and general pre-treatment processes of degreasing, shot blasting, film-forming, and adhesive application, thus requiring significant time, equipment, labor, and cost.

Furthermore, the mounting bush must have the basic functions that the anti-roll bar controls forces in a P-direction (vertical direction of the vehicle) and a Q-direction (length direction of the bar, lateral direction of the vehicle), and accommodates forces in an R-direction (rotational direction of the bar, Q-axis rotational direction of the vehicle, PITCH direction). However, conventional mounting bushes have insufficient stiffness to handle forces in the P-direction and Q-direction, and specifically, have a structure that the rotational force in the R-direction is difficult to accommodate rotational actions due to the stiffness of the rubber itself.

That it is difficult to accommodate the rotational actions without load means a rapid progression in the load and aging of the rubber. As the load (rotational angle) of the rubber increases, the stiffness in the R-direction also increases, leading to a reduced ability to accommodate the rotational force, and eventually, rubber damage occurs.

SUMMARY OF THE INVENTION

Accordingly, the present invention has been made to solve the above-mentioned problems occurring in the prior arts, and it is an objective of the present invention to provide a bush that can be manufactured quickly and simply and reduce the overall weight. it is an objective of the present invention to provide a bush, which can withstand forces in the P-direction and the Q-direction and enhance response ability to approach load-free rotational actions in the R-direction, thereby increasing the lifespan.

To accomplish the above object, according to the present invention, there is provided a bearing type bush for mounting an anti-roll bar of a vehicle or a mechanical device including: pressure bodies made of rubber material surrounding an anti-roll bar; bearing plates made of plastic material (or other lightweight material) surrounding the pressure body; an upper bracket made of plastic material covering the bearing plate from above; and a lower bracket coupled to a lower portion of the upper bracket and surrounding the bearing plate together with the upper bracket.

The pressure bodies are composed of two semi-circular parts and the bearing plates are composed of two semi-circular parts that are combined to form a circle.

The pressure bodies and the bearing plates have contact force to each other and anti-sliding properties, thereby enhancing the ability to prevent dislocation in the Q-direction, and allowing rotation together in a coupled state.

Additionally, the bearing plates, the upper bracket, and the lower bracket are configured to rotate while sliding relative to each other, and due to a lubricant, a rotational force in the R-direction can be accepted smoothly.

In addition, bearing seals can be installed at both side entrances of the upper bracket and the lower bracket.

As described above, the bearing type bush of the present invention is mounted on the anti-roll bar by effective combination of the pressure body and the bearing plate so that when loads in the P-direction and in the Q-direction are applied, the bearing type bush can effectively bear the loads while the loads are sequentially transmitted to the pressure body, the bearing plate engaging with the pressure body, the upper bracket, and the lower bracket.

Particularly, when the force in the rotational direction (R-direction) is applied, due to the effective combination structure between the pressure body and the bearing plate, the rotational force is transmitted to the bearing plate through the pressure body, and a lubricant is included among the bearing plate, the upper bracket, and the lower bracket, thus effectively accommodating the rotational force of the anti-roll bar with almost no friction.

Additionally, since the bearing plate, the upper bracket, and the lower bracket, except for the pressure body, are injection molded from plastic, the manufacturing process is simplified, and the overall weight of the mounting bush is significantly reduced.

Specifically, the robust connection between the rubber pressure body and the bearing plate and the enhanced friction prevent slipping between the rubber pressure body and the bearing plate, thereby effectively transmitting the rotational force of the anti-roll bar to the bearing plate.

In addition, among the bearing plate, the upper bracket, and the lower bracket, the rotation of the bearing plate can be accommodated smoothly and substantially, the force in the Q-direction can be borne robustly, and separation or impact can be prevented.

DETAILED DESCRIPTION OF THE PREFERRED EMBODIMENT

Hereinafter, the configuration of a bearing type bush for mounting an anti-roll bar according to embodiments of the present invention will be described in detail.

Figure 1:
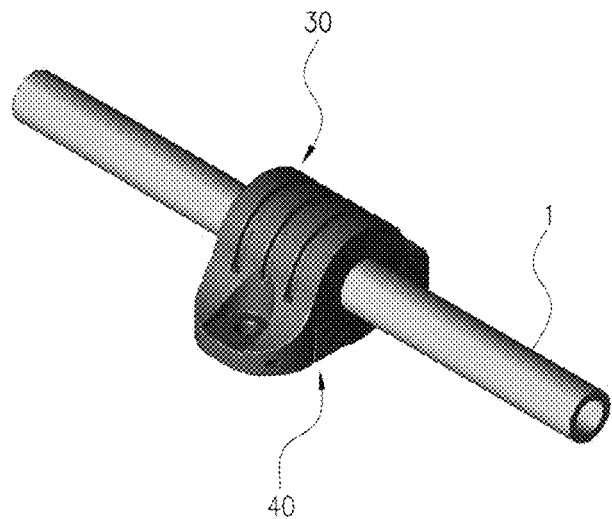
FIG. 1 is a perspective view illustrating the entire assembly of the present invention.
Figure 2:
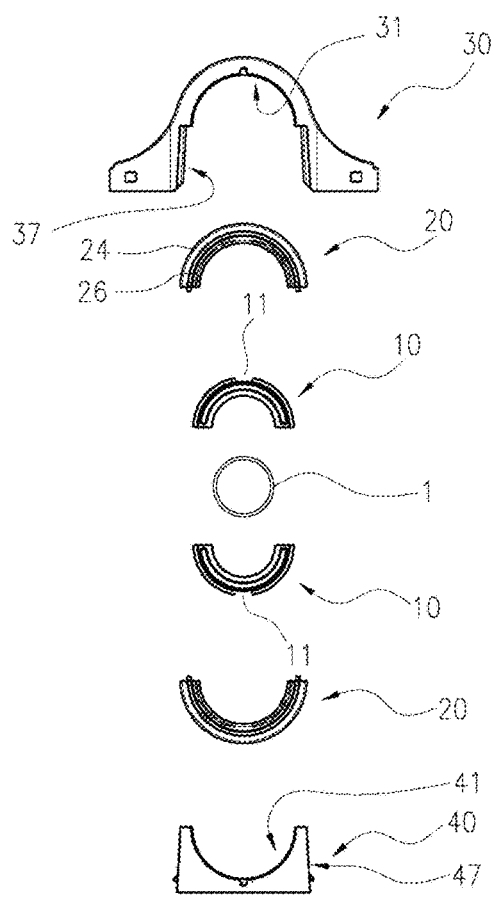
FIG. 2 is an exploded view of the present invention.

As illustrated in FIG. 1 and FIG. 2, the bearing type bush of the present invention includes: pressure bodies 10 made of rubber material surrounding an anti-roll bar 1; bearing plates 20 made of plastic material surrounding the pressure body; an upper bracket 30 made of plastic material covering the bearing plate 20 from above; and a lower bracket 40 coupled to a lower portion of the upper bracket 30 and surrounding the bearing plate 20 together with the upper bracket 30.

Figure 3:
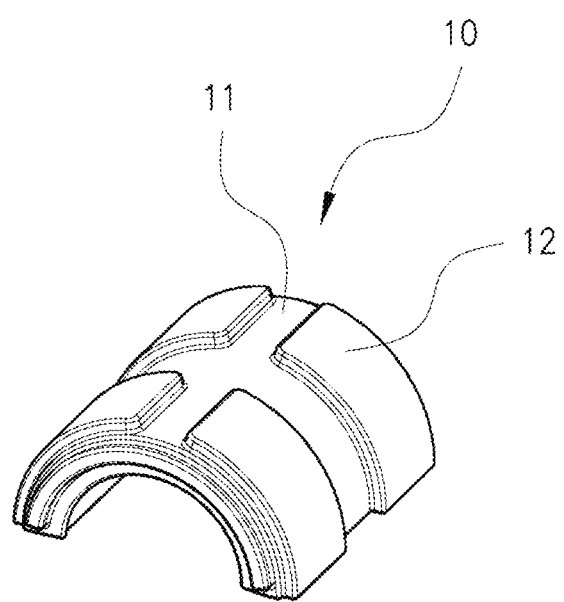
FIG. 3 is a perspective view of a pressure body of the present invention.

The pressure bodies 10, as illustrated in FIG. 2 and FIG. 3, are composed of two semi-circular parts that, when joined, form a circle to fully surround the anti-roll bar 1. On the outer surface of each pressure body 10, a cross-shaped outer concave part 11 and four square-shaped outer protrusions 12 protruding due to the formation of the outer concave part 11 are formed.

Inside the pressure body 10, a plate made of metallic material is insert-molded to secure stiffness in a P-direction and maintain the shape of the pressure body.

Figure 4A:
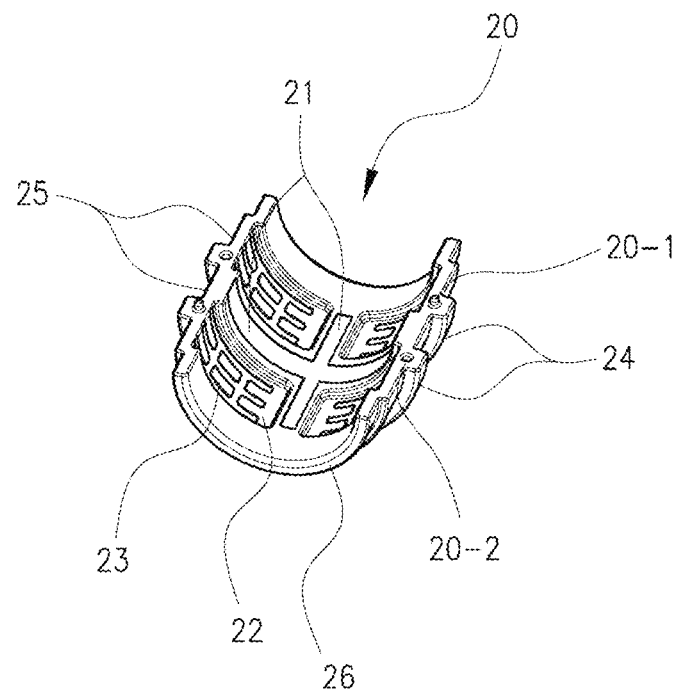
FIG. 4a is an inner perspective view of a bearing plate of the present invention.
Figure 4B:
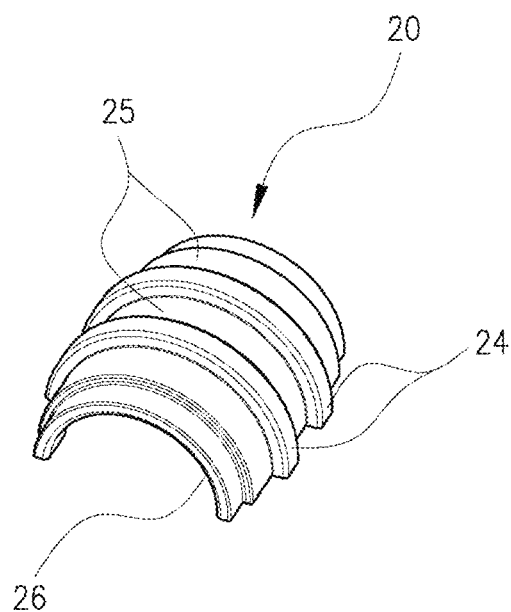
FIG. 4b is an outer perspective view of the bearing plate of the present invention.
Figure 5A:
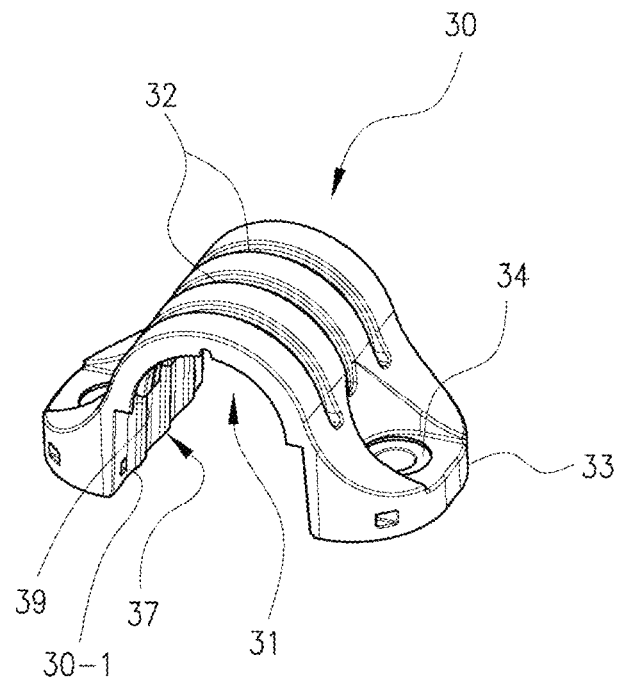
FIG. 5a is a perspective view of an upper bracket of the present invention.
Figure 5B:
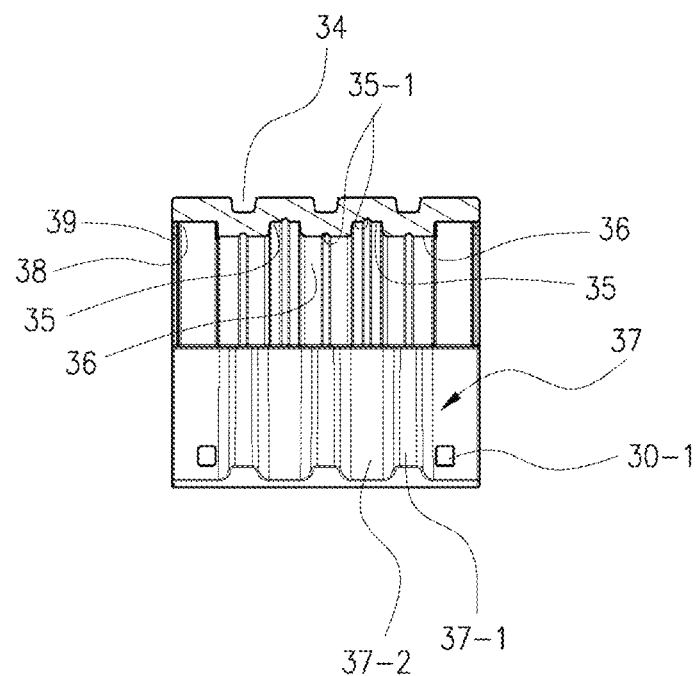
FIG. 5b is a sectional view of the upper bracket of the present invention.
Figure 6A:
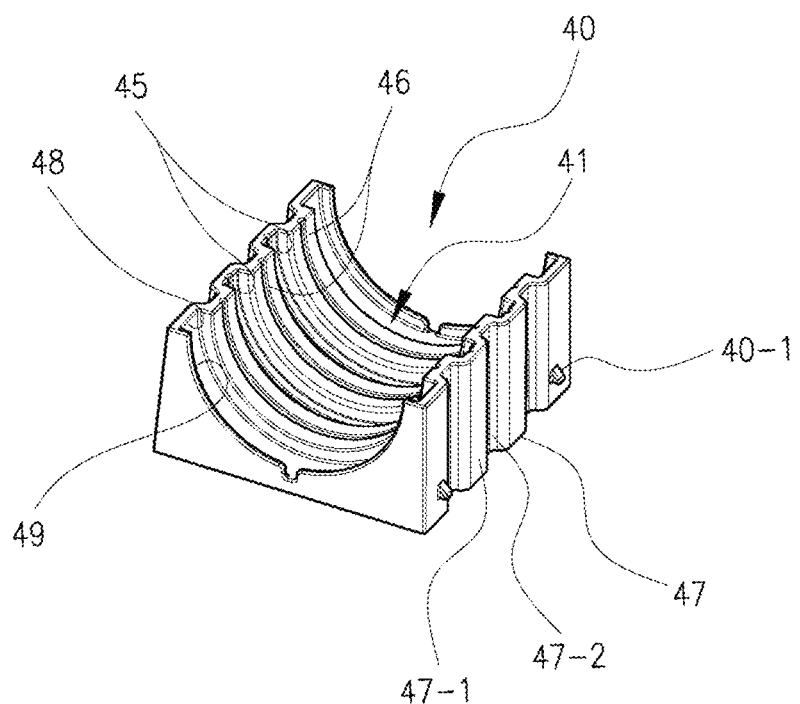
FIG. 6a is a perspective view of a lower bracket of the present invention.
Figure 6B:
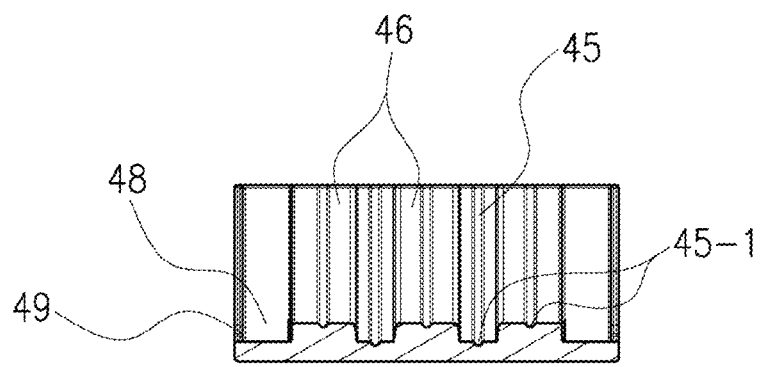
FIG. 6b is a sectional view of the lower bracket of the present invention.
Figure 7:
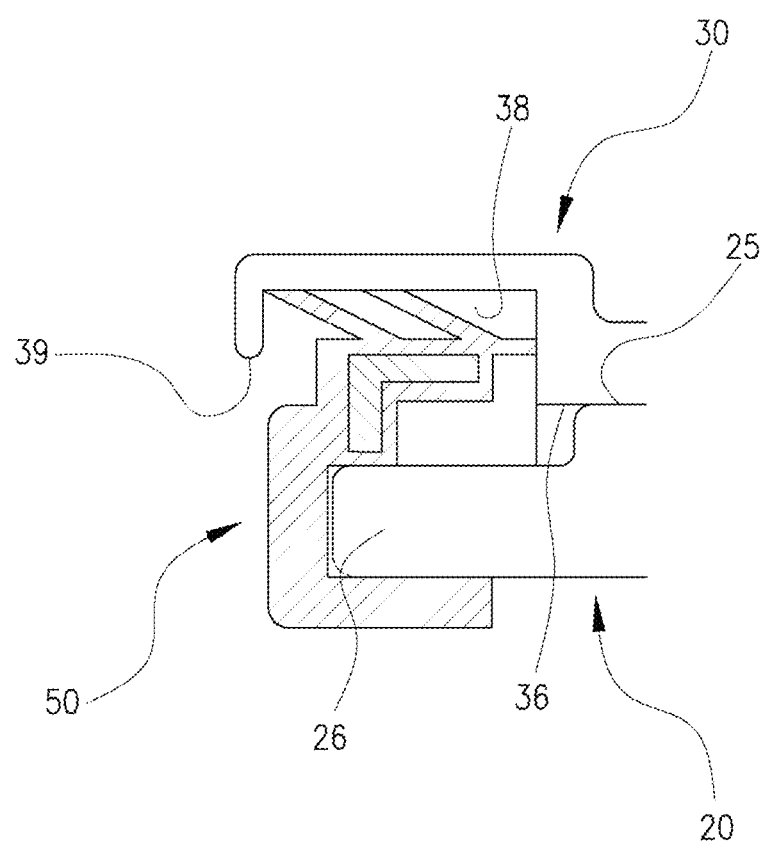
FIG. 7 is a partially sectional view illustrating a mounted state of a bearing seal of the present invention.

The bearing plates 20, as illustrated in FIG. 2 and FIGS. 4a and 4b, are also composed of two semi-circular parts. When the semi-circular parts meet, they form a circle so that the pressure body 10 fits snugly inside each bearing plate 20. The bearing plate 20 includes: an inner concave part 22 which matches the outer protrusions 12 of the pressure body 10; and an inner protrusion 21 formed at a protruding part where the inner concave part 22 is not formed, and matching the outer concave part 11.

On the inner surface of the inner concave part 22, an embossing 23 with a grid pattern is formed to enhance the friction when the outer protrusions 12 of the rubber pressure body 10 is in contact with the inner concave part 22.

Each bearing plate 20 includes: two sliding protrusions 24 formed along the outer peripheral surface thereof; three-sided outer friction surfaces 25 formed between the sliding protrusions 24 and on both sides of the sliding protrusions 24, such that the two sliding protrusions 24 formed at the central portion of the bearing plate 20 serve as a central furring of the bearing plate 20 to increase stiffness and also play a significant role in preventing Q-direction dislocation when coupled with the upper bracket 30 and the lower bracket 40.

Moreover, the bearing plate 20 includes seal coupling protrusions 26 formed at both ends thereof with a diameter smaller than that of the outer friction surfaces 25, allowing for the coupling of a bearing seal 50 between the upper bracket 30 and the lower bracket 40. The bearing plate 20 is generally step-shaped due to the sliding protrusions 24, the outer friction surfaces 25, and the seal coupling protrusions 26.

The two bearing plates 20 include coupling protrusions 20-1 and coupling grooves 20-2 on the facing surfaces at symmetrical positions to ensure accurate positioning when assembled, allowing for assembly without directional constraints.

The upper bracket 30 of the present invention includes support parts 33 protruding at lower ends of both sides thereof and washers 34 integrally formed inside by insert-molding, so that the upper bracket 30 can be fixed to the vehicle body using the part where the washers 34 are formed. The lower bracket 40 is coupled inside the lower portion of the upper bracket 30.

The upper bracket 30 includes a semi-circular upper assembly surface 31 which is formed on the upper inner surface of the upper bracket and surrounds the outer surface of the bearing plate 20, and the lower bracket 40 includes a semi-circular lower assembly surface 41 which is formed on the upper inner surface of the lower bracket, wherein the lower assembly surface 41 of the lower bracket 40 and the upper assembly surface 31 of the upper bracket 30 combine to form a circle, and are assembled while enclosing the bearing plates 20 coupled with the pressure bodies 10.

Sliding concave parts 35 and 45 that match the sliding protrusions 24 of the bearing plate 20 are formed on the upper assembly surface 31 and the lower assembly surface 41 respectively, and inner friction surfaces 36 and 46 that match the outer friction surface 25 of the bearing plate 20 are formed between the sliding concave parts 35 and 45 and on both sides of the sliding concave parts. Lubricant grooves 35-1 and 45-1 are formed in the sliding concave parts 35 and 45 and the inner friction surfaces 36 and 46 respectively to retain lubricant.

During assembly, lubricant, such as grease, is applied between the sliding protrusions 24 and the outer friction surfaces 25 of the bearing plate 20 and the sliding concave parts 35 and 45 and inner friction surfaces 36, 46 of the upper bracket 30 and the lower bracket 40 being in contact with the bearing plate 20, thereby enabling nearly load-free sliding in the R-direction of the anti-roll bar 1.

On the inner coupling surface 37 of the lower inner surface of the upper bracket 30 where the lower bracket 40 is coupled, inner coupling protrusions 37-1 and inner coupling concave parts 37-2 are formed in line with the sliding concave parts 35 and the inner friction surfaces 36, and on the outer coupling surface 47 of the lower bracket 40 where the upper bracket 30 is coupled, outer coupling concave parts 47-2 and outer coupling protrusions 47-1 corresponding to the inner coupling protrusions 37-1 and the inner coupling concave parts 37-2 are formed, facilitating smooth coupling and maintaining stiffness in the Q-direction. Thinning grooves 32 are formed on the outer surface corresponding to the inner friction surfaces 36 of the upper bracket 30 to form a zigzag cross-section, thereby reducing overall weight and supplementing stiffness as a structural support.

Seal coupling recesses 38 and 48 and retaining jaws 39 and 49 for coupling the bearing seal 50 are formed at both side entrances of the upper bracket 30 and the lower bracket 40, thereby facilitating stable coupling of the bearing seal 50 together with the seal coupling protrusions 26 of the bearing plate 20.

The upper bracket 30 and the lower bracket 40 respectively include retaining grooves 30-1 and retaining jaws 40-1 formed to maintain coupling force when joined together.

Now, the assembly process and operation of the bearing type bush of the present invention will be described.

When the bearing type bush of the present invention is coupled to the anti-roll bar 1, the rubber pressure bodies 10 and the bearing plates 20 are first combined at an installation position of the anti-roll bar 1. The pressure bodies 10 are respectively seated inside the bearing plates 20, so that the outer concave parts 11 and the outer protrusions 12 of the pressure bodies 10 interlock with the inner protrusions 21 and the inner concave parts 22 of the bearing plates 20, respectively. So, the pressure bodies and the bearing plates 20 are firmly coupled in the R-direction and the Q-direction, thereby perfectly preventing sliding therebetween.

In this instance, the outer protrusions 12 of the pressure body 10 are in close contact with the embossing 23 of the bearing plate 20.

As described above, after the pressure bodies 10 are coupled to the bearing plates 20, the two bearing plates 20 are coupled to face each other in a circular form while surrounding the position where the anti-roll bar 1 will be installed. Thereafter, the upper bracket 30 and the lower bracket 40 are coupled to surround the assembled bearing plates 20, and then, a lubricant is applied to the outer surfaces of the bearing plates 20, the upper assembly surface 31 of the upper bracket 30, and the lower assembly surface 41 of the lower bracket 40 to couple them.

That is, the bearing plate 20 is in contact with the upper assembly surface 31 of the upper bracket 30 and the lower bracket 40 is assembled to the upper bracket 30. When the outer coupling surface 47 of the lower bracket 40 is in close contact with the inner coupling surface 37 of the upper bracket 30, the inner coupling protrusion 37-1, the outer coupling concave part 47-2, the inner coupling concave part 37-2, and the outer coupling protrusion 47-1 are coupled firmly, and the sliding protrusions 24 and the outer friction surfaces 25 of the bearing plates 20 tightly engage with the sliding concave parts 35 and 45 and the inner friction surfaces 36 and 46 of the upper bracket 30 and the lower bracket 40, completing the coupling.

Thereafter, the bearing type bush is fixed to a vehicle body by using the support parts of the upper bracket 30 via bolts or U-bolts, completing the installation. If necessary, the bearing seal 50 can be installed to prevent the ingress of contaminants and leakage of lubricant, and enhancing the seal. The bearing seal 50 can be coupled using the seal coupling protrusions 26 of the bearing plate 20 and the coupling recesses 38 and 48 and the retaining jaws 39 and 49 formed on the upper bracket 30 and the lower bracket 40.

The operation of the bearing type bush in the combined state will be described.

In the state in which the pressure bodies 10 and the bearing plates 20 are effectively combined with each other, the bearing type bush is mounted on the vehicle body via the upper bracket 30 and the lower bracket 40. After the bearing type bush is mounted on the anti-roll bar 1, when a P-direction load, or a Q-direction movement force, and an R-direction rotational force is applied, the load or force is first transmitted to the pressure bodies 10, and then, transmitted to the bearing plates 20 engaging with the pressure bodies 10, the upper bracket 30, and the lower bracket 40, thereby effectively bearing the load. Particularly, for the R-direction rotational force, very smooth sliding occurs between the bearing plates 20 and the upper bracket 30/lower bracket 40 due to the lubricant, thus effectively absorbing and dissipating the rotational force.

Specifically, the bearing type bush of the present invention, when the pressure body 10 and the bearing plate 20 are combined, the outer concave parts 11 and the outer protrusions 12 of the pressure bodies 10 engage respectively with the inner protrusions 21 and the inner concave parts 22 of the bearing plates 20 such that the anti-roll bar 1 can robustly respond to the force acting in the Q-direction.

Additionally, the outer protrusion 12 of the pressure body 1 is in close contact with the embossing 23 of the bearing plate 20, thus increasing frictional force upon final combination to more powerfully prevent movement between the pressure body 10 and the bearing plate 20.

Furthermore, when the sliding protrusions 24 and the outer friction surfaces 25 of the bearing plate 20 are accurately and tightly combined with the sliding concave parts 35 and 45 and the inner friction surfaces 36 and 46 of the upper bracket 30 and the lower bracket 40, the combination is completed. So, in the state in which the bearing plates 20, the upper bracket 30, and the lower bracket 40 are coupled, the Q-direction dislocation is robustly prevented, and the rotational force of the anti-roll bar 1 is transmitted through the pressure bodies 10 to the bearing plates 20. Since the bearing plates 20 are combined with the upper bracket 30 and the lower bracket 40 in the state where lubricant is applied therebetween, thus accepting rotation with almost no friction.

In addition, the bearing seal 50 has the advantage of preventing the ingress of foreign substances and the leakage of lubricant, thereby permanently maintaining smooth rotation.

What is claimed is:

1. A bearing type bush for mounting an anti-roll bar of a vehicle or a mechanical device comprising:

pressure bodies made of rubber material surrounding the anti-roll bar;

bearing plates made of plastic material surrounding the pressure bodies;

an upper bracket made of plastic material covering the bearing plates from above; and a lower bracket coupled to a lower portion of the upper bracket and surrounding the bearing plates together with the upper bracket, wherein the pressure bodies include two semicircular parts that, when joined, form a circle to fully surround the anti-roll bar, wherein on the outer surface of each of the pressure bodies, a cross-shaped outer concave part and four square-shaped outer protrusions protruding due to the formation of the outer concave part are formed, wherein the bearing plates are composed of two semi-circular parts, the semi-circular parts form a circle when meeting so that the pressure bodies fit snugly inside each of the bearing plates wherein each of the bearing plates includes: two sliding protrusions formed along the outer peripheral surface thereof; three-sided outer friction surfaces formed between the sliding protrusions and on both sides of the sliding protrusions, wherein each of the bearing plates includes seal coupling protrusions formed at both ends thereof with a diameter smaller than that of the outer friction surfaces, thus being generally step-shaped due to the sliding protrusions, the outer friction surfaces, and the seal coupling protrusions, and wherein the upper bracket includes a semi-circular upper assembly surface formed on the upper inner surface of the upper bracket and surrounds the outer surface of the bearing plates, and the lower bracket includes a semi-circular lower assembly surface formed on the upper inner surface thereof, to be assembled while enclosing the bearing plates coupled with the pressure bodies, and wherein sliding concave parts that match the sliding protrusions of the bearing plates are formed on the upper assembly surface and the lower assembly surface respectively, and inner friction surfaces that match the outer friction surface of the bearing plates are formed between the sliding concave parts and on both sides thereof.

2. The bearing type bush according to claim 1, wherein an embossing with a grid pattern is formed on the inner surface of the inner concave part to enhance the friction when the outer protrusions of the rubber pressure bodies is in contact with the inner concave part.

3. The bearing type bush according to claim 1, wherein a plurality of seal coupling recesses and a plurality of retaining jaws for coupling a bearing seal are formed at both side entrances of the upper bracket and the lower bracket, thereby facilitating the coupling of the bearing seal together with seal coupling protrusions of the bearing plates.

* * * * *